US012808581B1

(12) United States Patent
Saeed et al.

(10) Patent No.: US 12,808,581 B1
(45) Date of Patent: Nov. 24, 2026

(54) SOLAR PARTICLE HEATING SYSTEM AND METHODS OF USE THEREOF

(71) Applicant: KING SAUD UNIVERSITY, Riyadh (SA)

(72) Inventors: Rageh Saadallah Ali Saeed, Riyadh (SA); Eldwin Djajadiwinata, Riyadh (SA); Nader Shaif Saleh, Riyadh (SA); Shaker Saeed Abdullah Alaqel, Riyadh (SA); Saeed Mohammed Alzahrani, Riyadh (SA); Hany Abdurrahman Al-Ansary, Riyadh (SA); Abdelrahman Mahmoud Elleathy, Riyadh (SA); Zeyad Abdulrahman Alsuhaibani, Riyadh (SA); Syed Noman Danish, Riyadh (SA); Arfat Anis Mohammad Anis Khan, Riyadh (SA); Ahmed Ali Saleh Algobany, Riyadh (SA); Sheldon Jeter, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 7 days.

(21) Appl. No.: 19/455,327

(22) Filed: Jan. 21, 2026

(51) Int. Cl.
*F24D 11/00* (2022.01)
*B65G 17/12* (2006.01)
(Continued)

(52) U.S. Cl.
CPC .............. *F24S 20/20* (2018.05); *B65G 17/12* (2013.01); *F24S 30/425* (2018.05); *F24S 50/40* (2018.05);
(Continued)

(58) Field of Classification Search
CPC .......... F24S 20/20; F24S 30/425; F24S 50/40; F24S 60/00; B65G 17/12; B65G 2201/042
(Continued)

(56) References Cited

U.S. PATENT DOCUMENTS

| | | | | |
|---|---|---|---|---|
| 3,908,632 A * | 9/1975 | Poulsen | .................. | F24S 80/20 34/589 |
| 4,338,919 A * | 7/1982 | Hwang | .................. | F24S 80/20 126/640 |

(Continued)

FOREIGN PATENT DOCUMENTS

| | | |
|---|---|---|
| CN | 115978809 B | 9/2025 |

OTHER PUBLICATIONS

Al-Ansary, et al., "Study of the optimum discrete structure configuration in obstructed flow particle heating receivers", AIP Conf. Proc. 2303, 030001 (2020), Dec. 11, 2020, DOI: https://doi.org/10.1063/5.0029145.

*Primary Examiner* — Avinash A Savani
(74) *Attorney, Agent, or Firm* — Nath, Goldberg & Meyer; Joshua B. Goldberg

(57) ABSTRACT

A solar particle heating system includes at solar irradiator configured to direct solar radiation toward a solar irradiation zone, a particle feeder tank configured to store and discharge solid particles at a controlled flow rate, a horizontal particle conveyor configured to transport particles from the particle feeder tank to a particle heating receiver (PHR) positioned within a solar irradiation zone. The PHR includes a plurality of vertically stacked and angled particle support surfaces arranged to guide the particles downward while directly exposed solar radiation. The heated particles are discharged into a high-temperature thermal energy storage bin positioned beneath the particle heating receiver. The particle heating receiver may include a mechanically driven tray-
(Continued)

based conveyor, or be stationary and stair-shaped, allowing particles to descend by gravity. A control system may regulate particle residence time based on temperature feedback. The disclosed system enables high-temperature particle heating for power generation and other industrial applications.

15 Claims, 9 Drawing Sheets

(51) Int. Cl.

| | |
|---|---|
| ***F24S 20/20*** | (2018.01) |
| ***F24S 30/425*** | (2018.01) |
| ***F24S 50/40*** | (2018.01) |
| ***F24S 60/00*** | (2018.01) |

(52) U.S. Cl.
CPC ........ *F24S 60/00* (2018.05); *B65G 2201/042* (2013.01)

(58) Field of Classification Search
USPC .......................................................... 126/585
See application file for complete search history.

(56) References Cited

U.S. PATENT DOCUMENTS

| | | | | |
|---|---|---|---|---|
| 9,732,986 | B2 | 8/2017 | Al-Ansary et al. | |
| 9,829,217 | B2 * | 11/2017 | Maryamchik | F24S 20/20 |
| 10,508,834 | B1 * | 12/2019 | Ho | F24S 21/00 |
| 10,914,493 | B2 | 2/2021 | Ho et al. | |
| 2004/0123566 | A1 * | 7/2004 | Limousin | B65B 53/063 53/442 |
| 2024/0125516 | A1 * | 4/2024 | Xiao | F24S 21/00 |
| 2024/0361042 | A1 | 10/2024 | Kim et al. | |

* cited by examiner

SOLAR PARTICLE HEATING SYSTEM AND METHODS OF USE THEREOF

BACKGROUND

Field

The disclosure of the present patent application relates generally to solar thermal energy systems, and more particularly to particle-based concentrated solar power (CSP) systems employing solid particles as heat transfer and thermal energy storage media. The disclosure further relates to particle heating receivers, systems, and methods for heating solid particles using concentrated solar radiation for high-temperature power generation and industrial process heat applications.

Description of Related Art

Concentrated solar power (CSP) systems are known for converting solar radiation into thermal energy by concentrating sunlight onto a receiver, where the absorbed heat is used to generate electricity or provide industrial process heat. Conventional CSP technologies commonly rely on molten salts, oils, or gases as heat transfer fluids. While these systems have been successfully deployed, they suffer from several inherent limitations, including restricted operating temperature ranges, thermal stability constraints, freezing risks, and material degradation at elevated temperatures. These limitations can reduce overall system efficiency and restrict the applicability of CSP systems for high-temperature processes.

To overcome some of these challenges, particle-based CSP systems have been proposed in which solid particles are directly irradiated by concentrated solar radiation. Solid particles offer advantages over conventional fluids, including higher temperature capability, greater thermal stability, lower cost, and the ability to function as both a heat transfer medium and a thermal energy storage medium. However, known particle-based receivers present their own technical challenges.

Many existing particle receiver designs rely on free-falling particle curtains, in which particles fall through a concentrated solar flux region. While simple in concept, such designs often suffer from short particle residence times, non-uniform heating, significant radiative losses, and dust generation, which can reduce thermal efficiency and operational reliability. Additionally, controlling particle flow rate and residence time in free-fall systems is difficult, limiting the ability to precisely regulate particle outlet temperature under varying solar conditions.

Other particle receiver configurations utilize mechanically complex lifting or recirculation mechanisms to increase residence time or maintain particle exposure to solar radiation. These systems may introduce high-temperature mechanical components into the irradiated zone, increasing system cost, complexity, and maintenance requirements, while also raising concerns related to component durability, thermal expansion, and oxidation.

Furthermore, many known particle receivers lack effective real-time temperature feedback and control, making it difficult to dynamically adjust particle flow in response to changing solar irradiance, process demands, or operating conditions. This can result in particle overheating, underheating, or unstable operation, particularly in applications requiring precise thermal control, such as calcination or advanced power cycles.

Accordingly, there remains a need for a robust, high-temperature particle heating system that provides controlled particle residence time, uniform heating, reduced heat loss, and precise temperature regulation, while maintaining mechanical simplicity and adaptability to a wide range of power generation and industrial process heat applications.

SUMMARY

The present disclosure provides a solar particle heating system and methods of use for heating solid particles using concentrated solar radiation and for storing and utilizing the resulting high-temperature thermal energy. The system is particularly suited for particle-based concentrated solar power (CSP) applications and high-temperature industrial process heat, including applications requiring temperatures exceeding 1000° C.

In one aspect, the disclosure relates to a solar particle heating system comprising at least one solar irradiator configured to direct solar radiation toward a target area defining a solar irradiation zone. A particle feeder tank is configured to store solid particles and discharge the particles at a controlled flow rate onto a horizontal particle conveyor positioned beneath the particle feeder tank. The horizontal particle conveyor transports the particles to a particle heating receiver, which is positioned within the solar irradiation zone.

The particle heating receiver comprises a plurality of vertically stacked and angled particle support surfaces arranged to guide the particles downward through the solar irradiation zone while the particles are directly exposed to the solar radiation. As the particles traverse the particle heating receiver, they absorb thermal energy from the concentrated solar radiation and are heated to a desired temperature. Heated particles are discharged from the particle heating receiver into a high-temperature thermal energy storage bin positioned beneath the receiver, where thermal energy may be stored for later use.

In some embodiments, the particle heating receiver comprises a mechanically driven conveyor system including chains, sprockets, and rotating shafts, with a plurality of trays mounted to the chains by support bars or metal support members. The trays may be solid, perforated, or combinations thereof, and may have differing geometries selected to control particle retention, residence time, and heat transfer characteristics. In certain embodiments, the particle heating receiver is mounted on a tilt-adjustable frame to adjust the orientation of the particle support surfaces relative to the solar irradiation zone.

In other embodiments, the particle heating receiver comprises a stair-shaped configuration in which particles descend by gravity along stationary, vertically stacked, and angled particle support surfaces. These particle support surfaces may be formed from refractory materials, such as firebrick or ceramic materials, and may optionally include perforations or perforated obstructions to further regulate particle flow, enhance radiative trapping, and increase particle residence time.

In some embodiments, the system further includes a control system configured to regulate particle transport through the particle heating receiver. The control system may include a proportional-integral-derivative (PID) controller configured to regulate the speed of at least one conveyor, including the horizontal particle conveyor and/or the particle heating receiver. One or more temperature sensors, such as thermocouples, may be positioned at or near an outlet of the particle heating receiver to provide real-time temperature feedback. The control system compares measured particle temperature to a predetermined set point and adjusts particle transport speed to achieve a desired particle exit temperature.

In certain embodiments, the particle feeder tank includes an adjustable discharge opening in the form of a sliding plate or gate configured to regulate particle discharge flow rate. In further embodiments, a heat exchanger is positioned within or beneath the particle feeder tank and configured to transfer heat to particles prior to entry into the particle heating receiver. The heat exchanger may include a plurality of diamond-shaped heat exchange tubes to enhance heat transfer efficiency.

In another aspect, the disclosure provides a method of heating solid particles using solar radiation. The method includes directing solar radiation toward a solar irradiation zone, discharging particles from a particle feeder tank onto a horizontal conveyor, transporting the particles to a particle heating receiver, guiding the particles downward through the solar irradiation zone along vertically stacked and angled particle support surfaces while directly exposing the particles to solar radiation, and discharging the heated particles into a high-temperature thermal energy storage bin. The method may further include regulating particle residence time using a PID controller and may be performed using either a mechanically driven tray-based receiver or a gravity-driven stair-shaped receiver.

Advantageously, the disclosed system provides controlled particle residence time, uniform heating, high operating temperatures, and real-time temperature regulation, while maintaining mechanical simplicity and adaptability to a wide range of power generation and industrial process heat applications. The system supports the use of solid particles as both heat transfer and thermal energy storage media, enabling efficient, dispatchable solar thermal energy utilization.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
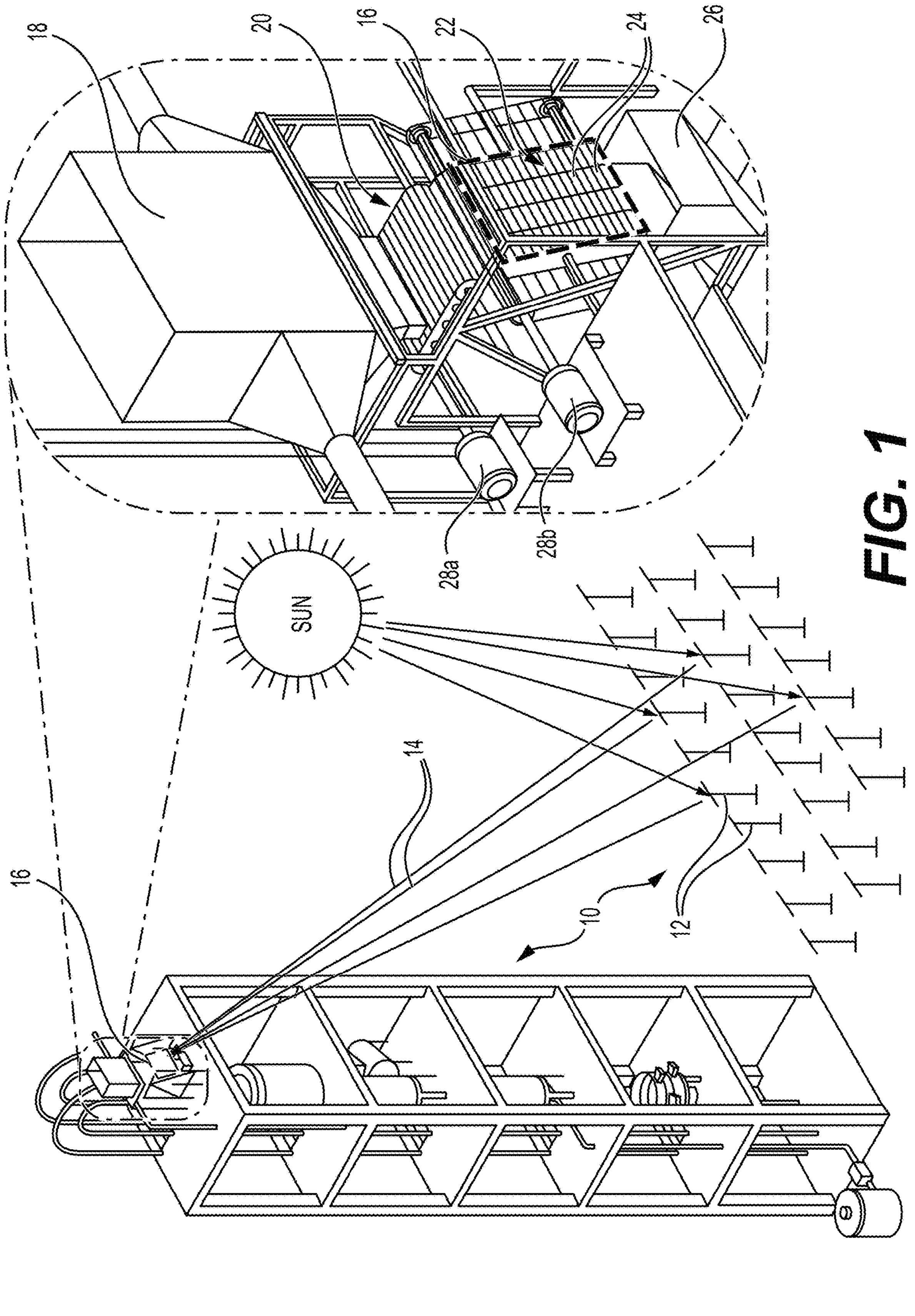
FIG. 1 is an environmental perspective view of a solar particle heating system and includes a close up perspective view of a particle feeder tank, horizontal particle conveyor, particle heating receiver, and thermal energy storage bin according to an embodiment.

FIG. 1 illustrates an exemplary embodiment of a solar particle heating system 10 configured to heat solid particles using concentrated solar radiation and to store the heated particles for subsequent energy utilization. The system 10 includes one or more solar irradiators 12, which may comprise heliostats or other reflective optical elements configured to track the sun and reflect solar radiation 14 toward a defined solar irradiation zone 16. As shown, the solar irradiators 12 are arranged in a field and oriented such that reflected solar radiation 14 converges toward the solar irradiation zone 16. While illustrated schematically, the solar irradiators 12 may be stationary or movable and sun-tracking, and may be implemented using any suitable reflector technology consistent with solar power tower systems.

Positioned above the solar irradiation zone 16 is a particle feeder tank 18, shown in the close-up view, which is configured to store a quantity of solid particles (not shown), such as sand, ceramic particles, or other high-temperature particulate media. The particle feeder tank 18 is adapted to discharge particles at a controlled flow rate, for example via a sliding plate or gate mechanism (shown in FIG. 2B), allowing regulated delivery of particles from the particle feeder tank 18. The particle feeder tank 18 may incorporate a heat exchanger or preheating section therein to raise the temperature of the particles prior to entry into the particle heating receiver (see FIG. 2C).

Disposed beneath the particle feeder tank 18 is a horizontal particle conveyor 20, which is configured to receive particles discharged from the particle feeder tank 18 and transport the particles laterally toward a particle heating receiver 22. The horizontal particle conveyor 20 may be implemented as a belt conveyor, bucket conveyor, or other suitable conveying mechanism capable of handling granular materials at elevated temperatures. The speed of the horizontal particle conveyor 20 may be adjustable and coordinated with downstream particle transport to ensure consistent particle loading. A motor **28*a* is provided for driving horizontal particle conveyor 20**.

The particle heating receiver 22 is positioned to receive particles from the horizontal particle conveyor 20 within the solar irradiation zone 16 so as to be directly exposed to the concentrated solar radiation 14. The particle heating receiver 22 comprises a plurality of vertically stacked and angled particle support surfaces 24, which are arranged and oriented to guide particles downward through the solar irradiation zone 16 while maintaining direct exposure of the particles to solar radiation 14.

In certain embodiments, the particle heating receiver 22 is mounted on a tilt-adjustable frame 23 that allows the angular orientation of the particle support surfaces 24 to be adjusted relative to the solar irradiation zone 16. The tilt-adjustable frame 23 may include pivot points, hinges, adjustable brackets, actuators, or combinations thereof. Adjustment of the tilt angle enables the particle heating receiver 22 to be oriented to optimize solar flux interception, particle residence time, and particle flow behavior under varying operating conditions. For example, increasing the inclination angle of the arrangement of particle support surfaces 24 may increase particle retention and residence time within the solar irradiation zone 16, while decreasing the inclination angle may increase particle throughput. The tilt angle may also be adjusted to account for changes in solar elevation, seasonal variations, or differences in particle size and material properties.

Figure 3A:
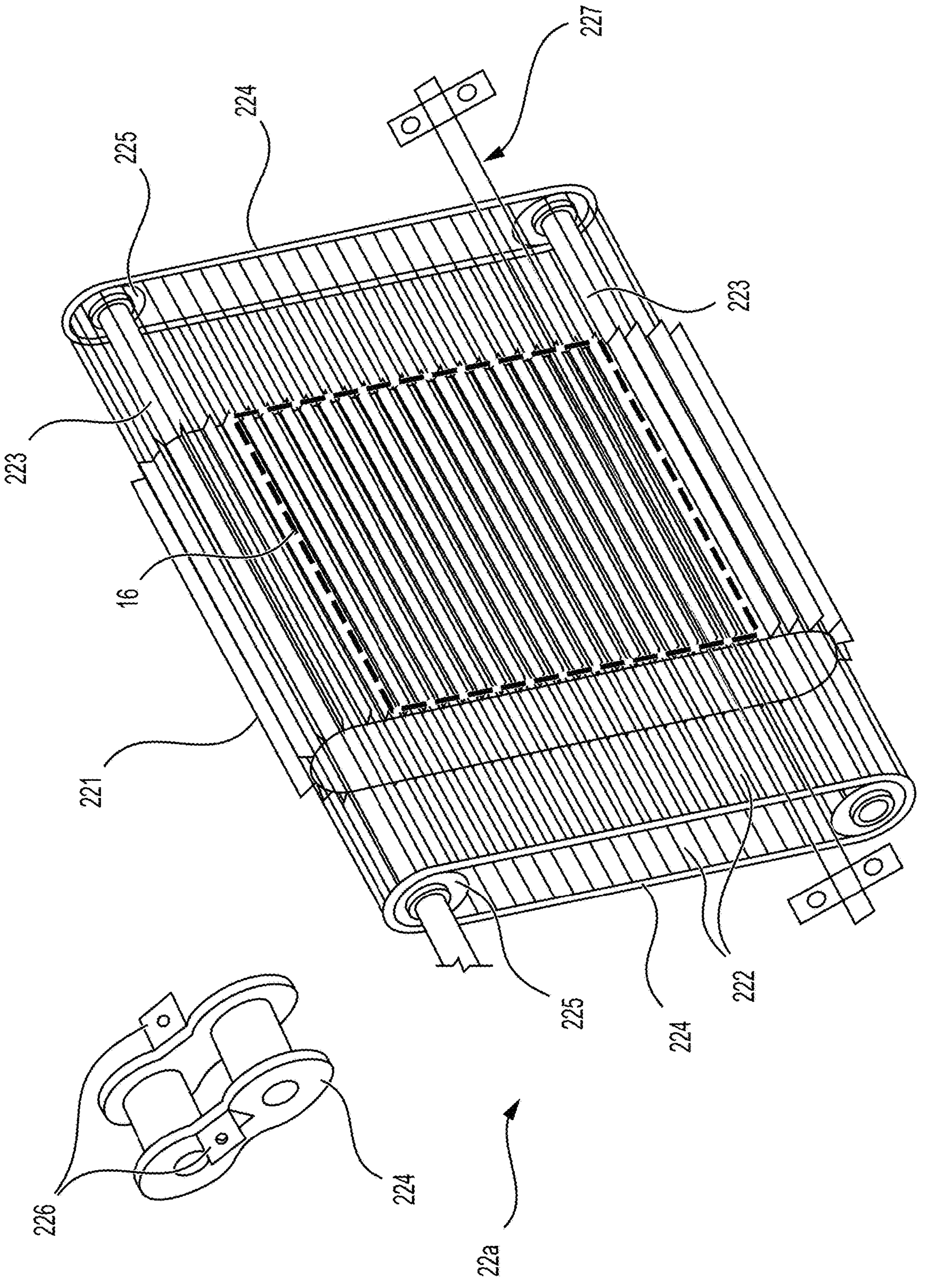
FIG. 3A is a perspective view of a tray-based particle heating receiver including trays mounted to chains driven by sprockets and shafts, support bars for mounting the trays, and thermocouples positioned to measure particle exit temperature.
Figure 3B:
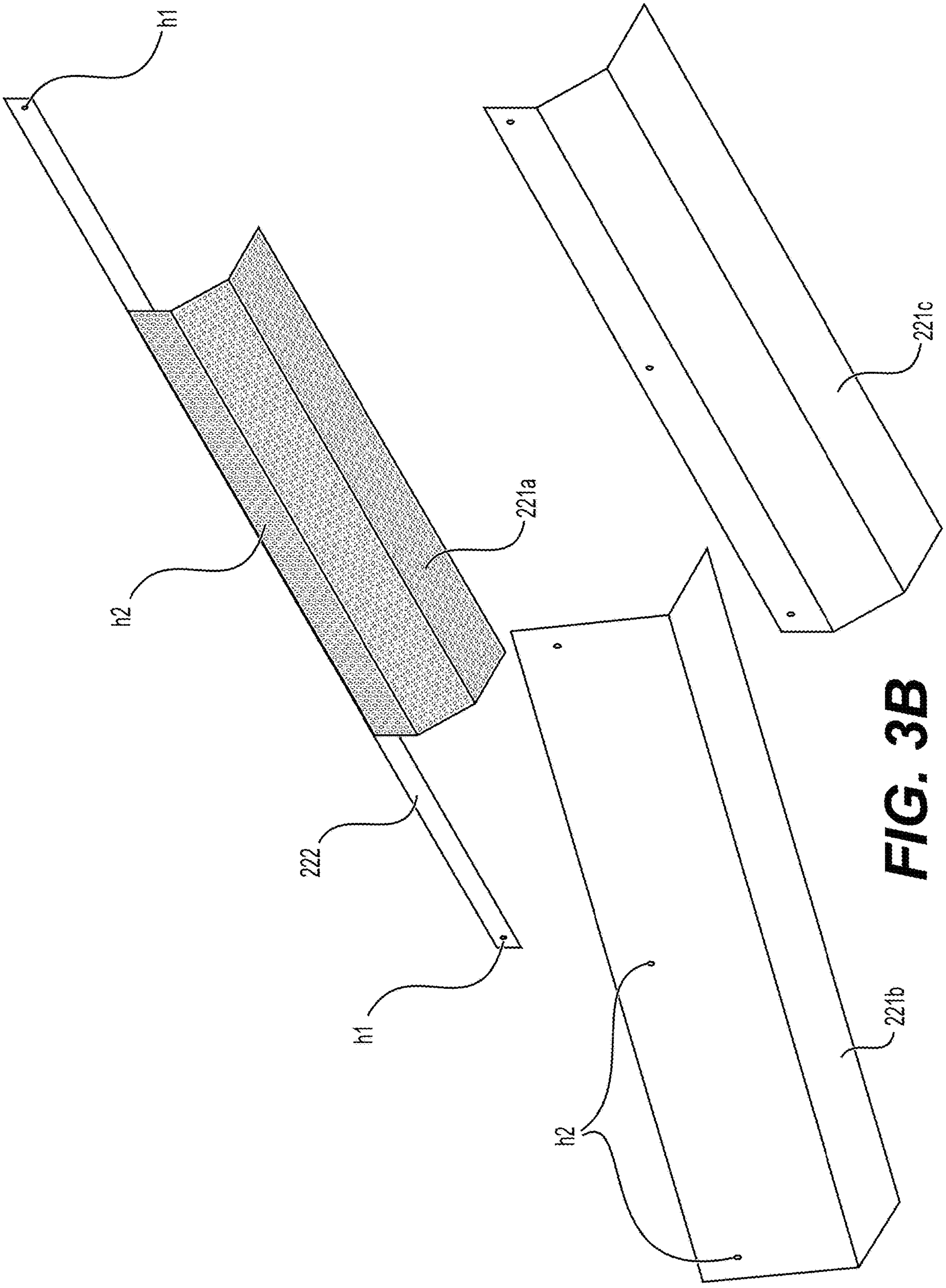
FIG. 3B illustrates exemplary tray configurations for the particle heating receiver of FIG. 3A, including perforated and non-perforated L-shaped trays with beveled or chamfered junctions.

The particle support surfaces 24 may be implemented as trays, steps, or stair-shaped surfaces arranged in a vertically angled configuration. The support surfaces 24 are vertically angled and staggered so as to control particle residence time, promote formation of a packed or semi-packed particle bed, and regulate particle velocity as the particles descend through the irradiation zone 16. In a first embodiment, the particle heating receiver 22 may include a mechanically driven conveyor system with chains and sprockets supporting the particle support surfaces 24. In this first embodiment, the chains and sprockets may be driven by a motor 28*b*. More details of the first embodiment are shown in FIGS. 3A-B. In other embodiments (see FIG. 4) the particle support surfaces 24 may be stationary stair-shaped structures that rely primarily on gravity to move particles downward. The design of the particle support surfaces 24, though, are not limited to the embodiments described herein and other configurations fall within the scope of the present disclosure.

The particle support surfaces 24 may be fabricated from refractory materials, metals, ceramics, or combinations thereof, and may be solid or perforated depending on the desired heat transfer characteristics and particle size. Perforations in the particle support surfaces 24, where provided, may permit partial transmission of solar radiation or gas flow while still retaining the particles on the surfaces.

As the particles traverse the particle heating receiver 22, they are progressively heated by direct exposure to the concentrated solar radiation 14 within solar irradiation zone 16. The geometry, spacing, and inclination of the individual particle support surfaces 24 are selected based on factors such as the intended application, particle residence time, and desired heat absorption.

Heated particles exiting the lower end of the particle heating receiver 22 are discharged into a high-temperature thermal energy storage bin 26 positioned beneath particle heating receiver 22. Thermal energy storage bin 26 is configured to receive and store the heated particles while minimizing thermal losses, thereby enabling later use of the stored thermal energy for a variety of industrial applications.

In some embodiments, the system 10 further includes a control system (see FIG. 5) configured to regulate particle flow rate and residence time by controlling the speed of the horizontal particle conveyor 20 and/or the particle heating receiver 22, for example using a proportional-integral-derivative (PID) controller responsive to temperature measurements at or near an outlet of the particle heating receiver 22.

Accordingly, FIG. 1 depicts an integrated solar particle heating system 10 in which solid particles are fed from the particle feeder tank 18, transported by the horizontal particle conveyor 20, heated within the particle heating receiver 22 by direct solar irradiation, and collected in the thermal energy storage bin 26 for subsequent energy use.

Figure 2A:
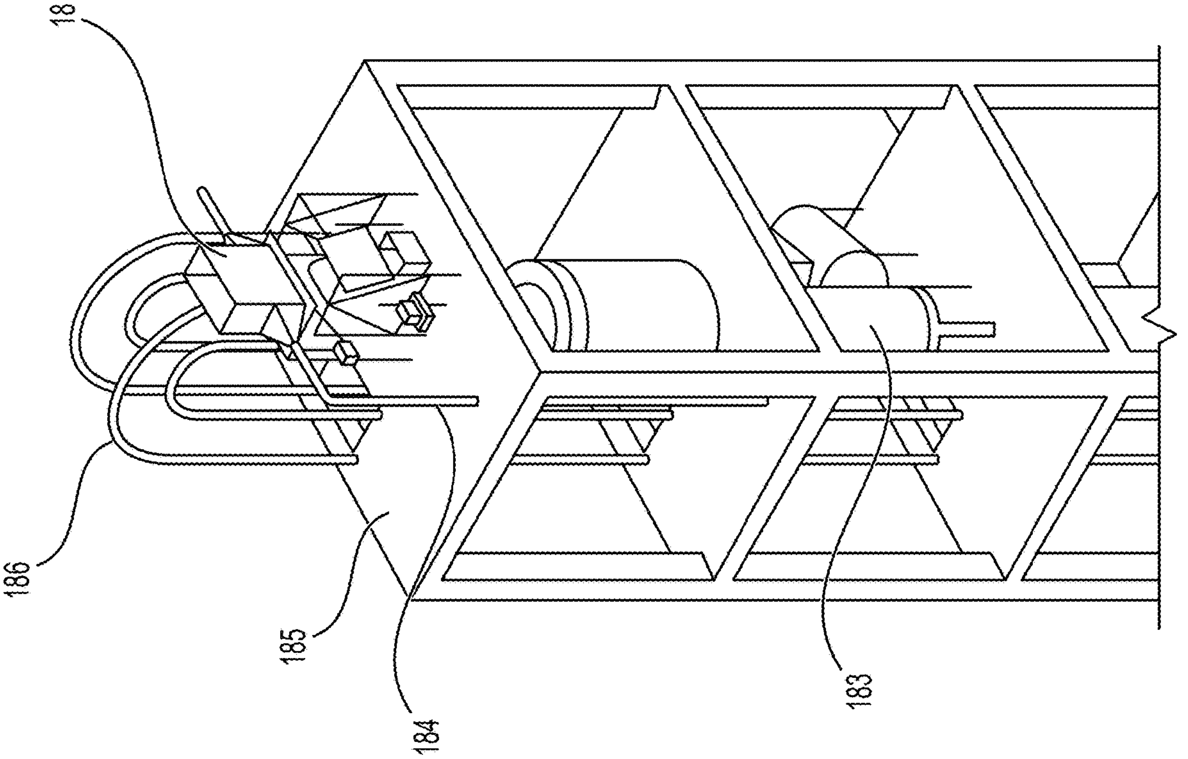
FIG. 2A is a perspective view of a tower and structural support frame including a particle feeder tank and a direct contact heat exchanger.
Figure 2B:
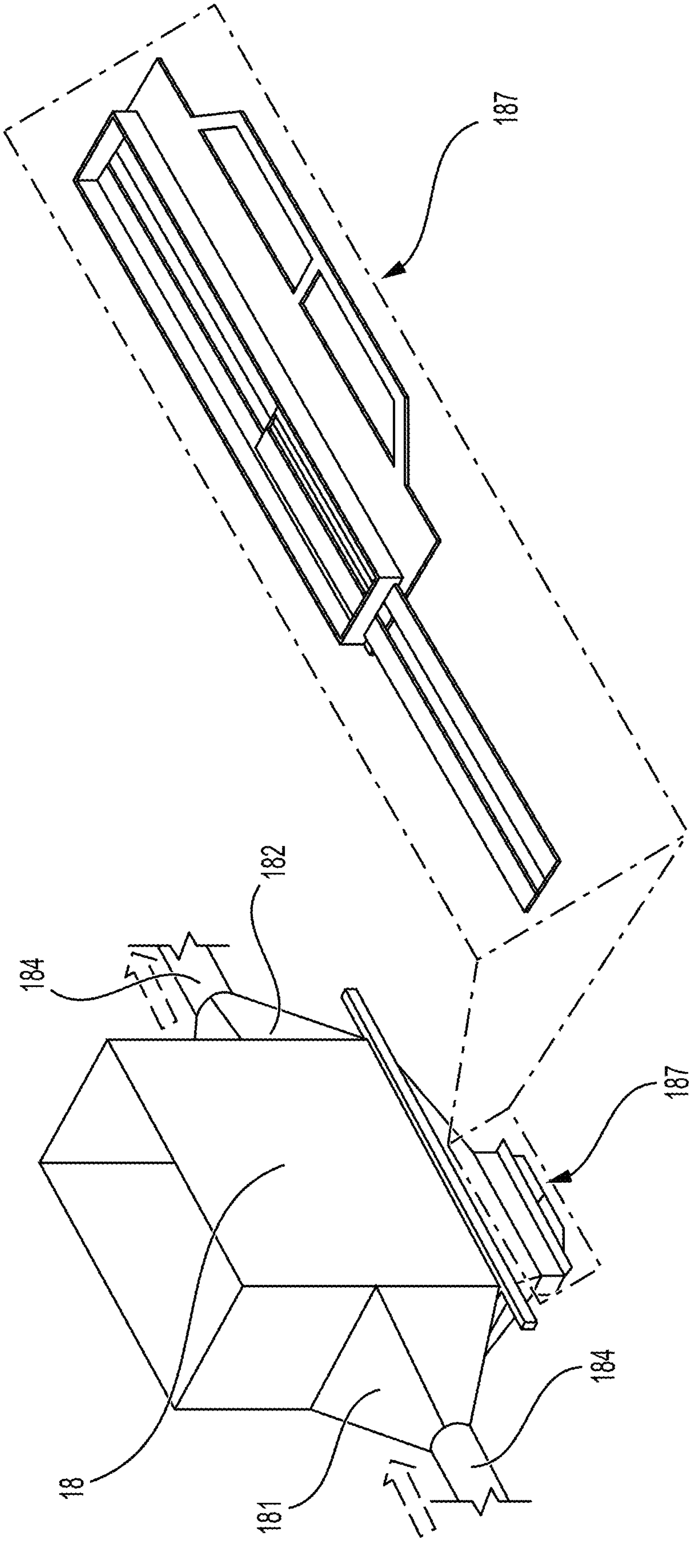
FIG. 2B is an enlarged perspective view of the particle feeder tank of FIG. 2A showing a hot air inlet, an air outlet, and a slide gate configured to regulate particle discharge from the particle feeder tank.
Figure 2C:
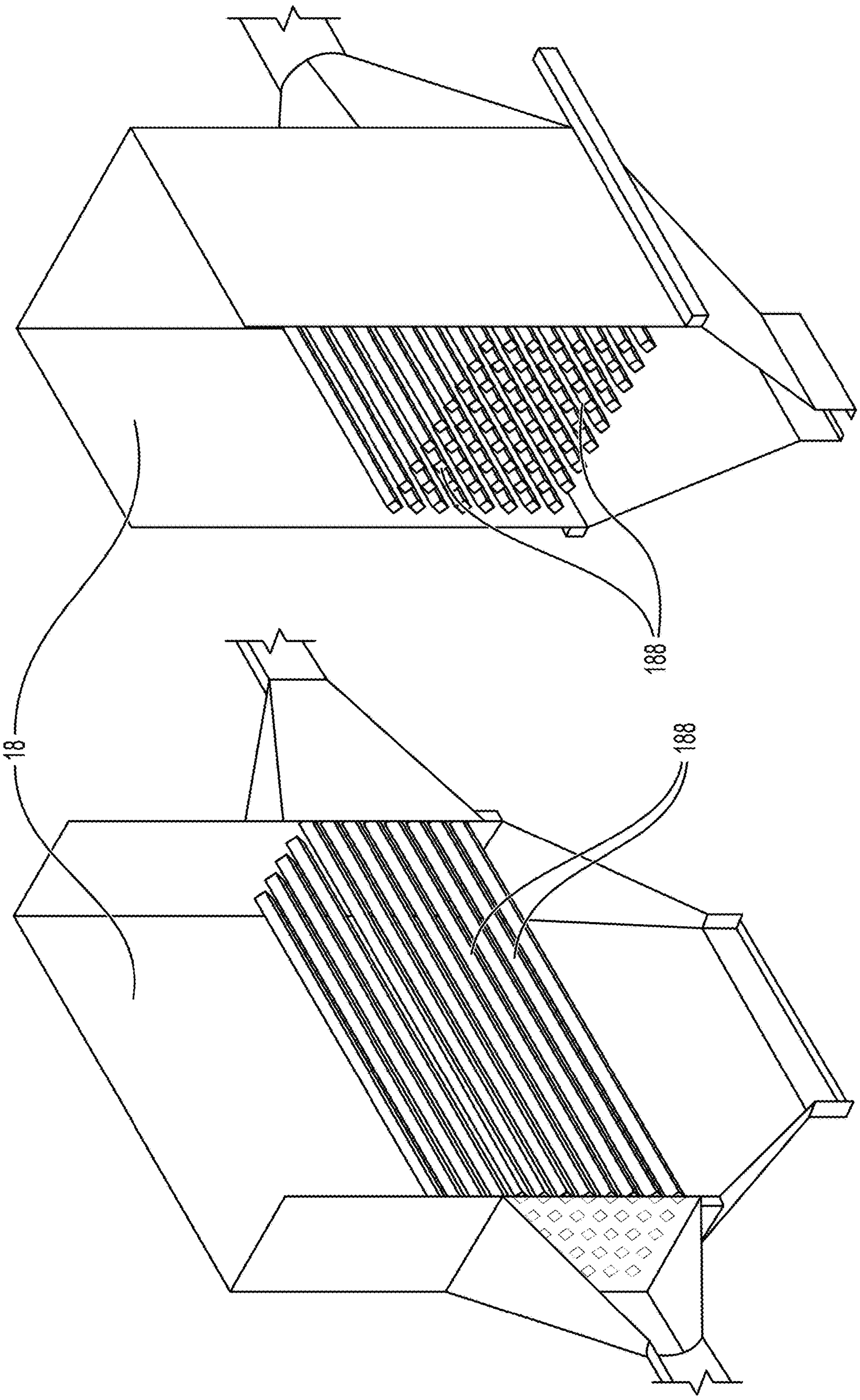
FIG. 2C is a perspective cutaway view of the particle feeder tank of FIG. 2B showing heat exchange pipes within the particle feeder tank.

Turning to FIGS. 2A-C, further details of particle feeder 18 are shown. FIG. 2A shows a perspective view of the upper portion of the system mounted on a tower 185, which includes a structural support frame 186. The structural support frame 186 provides a mounting structure for the particle feeding and heat exchange components, allowing gravity-assisted particle flow through the system.

Positioned at the upper end of the assembly is the particle feeder tank 18, configured to store solid particles and discharge them at a controlled flow rate. Beneath the particle feeder tank 18 and mounted within tower 185, direct contact heat exchanger 183 is arranged to transfer thermal energy from a heated gas stream to particles descending within particle feeder tank 18.

A network of piping 184 fluidly connects the direct contact heat exchanger 183 to the particle feeder tank 18. Piping 184 allows heated air to be routed between the heat exchanger 183 and the particle feeder tank 18, enabling thermal interaction between the gas and the particles contained within or passing through the particle feeder tank 18.

FIG. 2B provides a more detailed view of the particle feeder tank 18 and associated flow-control and gas-handling components. The particle feeder tank 18 includes a hot air inlet 181, through which heated air produced by the direct contact heat exchanger 183 enters the feeder tank. An air outlet 182 is provided on an opposing portion of the particle feeder tank 18 to allow exhaust or recirculated air to exit after transferring heat to the stored particles (not shown).

At a lower portion of the particle feeder tank 18, an adjustable discharge opening in the form of a sliding plate 187 is positioned to regulate the discharge of particles. The sliding plate 187 is movable to adjust the effective opening through which particles are discharged, thereby enabling variable particle mass flow rate control. Such adjustment allows coordination between particle flow rate and thermal conditions within the system. FIG. 2B also illustrates the connection between the piping 184 and the particle feeder tank 18, showing how heated air is delivered to the feeder tank 18 to facilitate transfer of heat to the particle bed prior to particle discharge.

FIG. 2C illustrates internal details of the particle feeder tank 18, which may include a plurality of heat exchange pipes 188 arranged therein. The heat exchange pipes 188 are configured to carry a heated gas stream from the direct contact heat exchanger 183 (of FIG. 2A) and are oriented to maximize thermal contact with particles flowing through the particle feeder tank 18.

As shown in the enlarged detail view, the heat exchange pipes 188 have a diamond-shaped cross section, which increases external surface area relative to conventional circular pipes. This geometry enhances heat transfer efficiency by promoting greater contact between the hot gas within the pipes and the surrounding particles or airflow. The angular surfaces of the diamond-shaped pipes also improve flow distribution and reduce stagnation zones, thereby improving overall heat exchange performance.

In operation, heated air enters the system through the hot air inlet 181, flows through the heat exchange pipes 188 of the particle feeder tank 18, and transfers thermal energy to particles passing through the feeder tank 18. The heated particles then move downward toward the particle heating conveyer, while the air exits via the air outlet 182.

Turning now to FIGS. 3A-B, FIG. 3A illustrates an embodiment of a tray-based particle heating receiver 22*a* configured to guide particles through a solar irradiation zone 16 while controlling particle residence time and exit temperature. The particle heating receiver includes a plurality of trays 221 arranged in a vertically angled and staggered configuration. Each tray 221 forms a particle support surface and is configured to receive and temporarily retain particles as they progress downward through the receiver. The trays 221 are mounted to a pair of opposing chains 224, which are driven by sprockets 225 mounted on rotating shafts 223. Rotation of the shafts 223 causes the chains 224 to circulate, thereby advancing the trays 221 through the irradiation zone 16 in a controlled manner.

Each tray 221 may be mounted by one or more support bars 222, which extend transversely between the opposing chains 224. The support bars 222 include mounting holes h1 (see FIG. 3B), which align with corresponding mounting holes h2 formed in the trays 221, thereby enabling secure mechanical attachment of the trays to the support bars using fasteners (not shown). In some embodiments, mounting brackets 226 may be provided on the chains 224 to facilitate attachment of the support bars 222 to the chains 224. In other embodiments, as in FIG. 3C, the trays 221 may be mounted directly to the mounting brackets 226 without the use of the support bars.

The trays 221 are positioned such that, when assembled, they collectively define a generally stair-like or stepped particle flow path. This configuration allows particles to be conveyed downward while maintaining a packed or semi-packed bed, thereby increasing residence time and enhancing heat absorption under direct solar irradiation. A support bar 227 for thermocouples may be included adjacent to an outlet region of the particle heating receiver 22*a*. The support bar 227 may be mounted to a frame on the support tower and remain stationary relative to the moving trays 221.

FIG. 3B illustrates exemplary tray geometries that may be employed in the particle heating receiver of FIG. 3A. A first embodiment comprises a perforated L-shaped tray 221*a* provided with a beveled or chamfered junction. The tray 221*a* includes a vertical riser section and a horizontal tread section joined by a beveled or chamfered transition. The perforations facilitate enhanced heat transfer by allowing partial transmission of solar radiation and gas flow while retaining particles on the tray surface.

A second embodiment 221*b* comprises a non-perforated L-shaped tray 221*b*, in which the riser and tread sections meet at a generally sharp junction. This configuration is suitable for applications requiring containment of finer particles or reduced particle leakage. A third embodiment 221*c* comprises a non-perforated L-shaped tray with a beveled or chamfered junction, combining the containment advantages of a solid tray with improved particle distribution and reduced stress concentration at the riser-tread junction.

Each of the tray embodiments 221*a*-221*c* includes mounting holes h2, which are positioned to align with the mounting holes h1 of the support bars 222, enabling interchangeability of tray designs within the same particle heating receiver assembly. The selection of tray geometry may be based on, for example, particle size, desired residence time, heat transfer characteristics, and operating temperature.

Figure 3C:
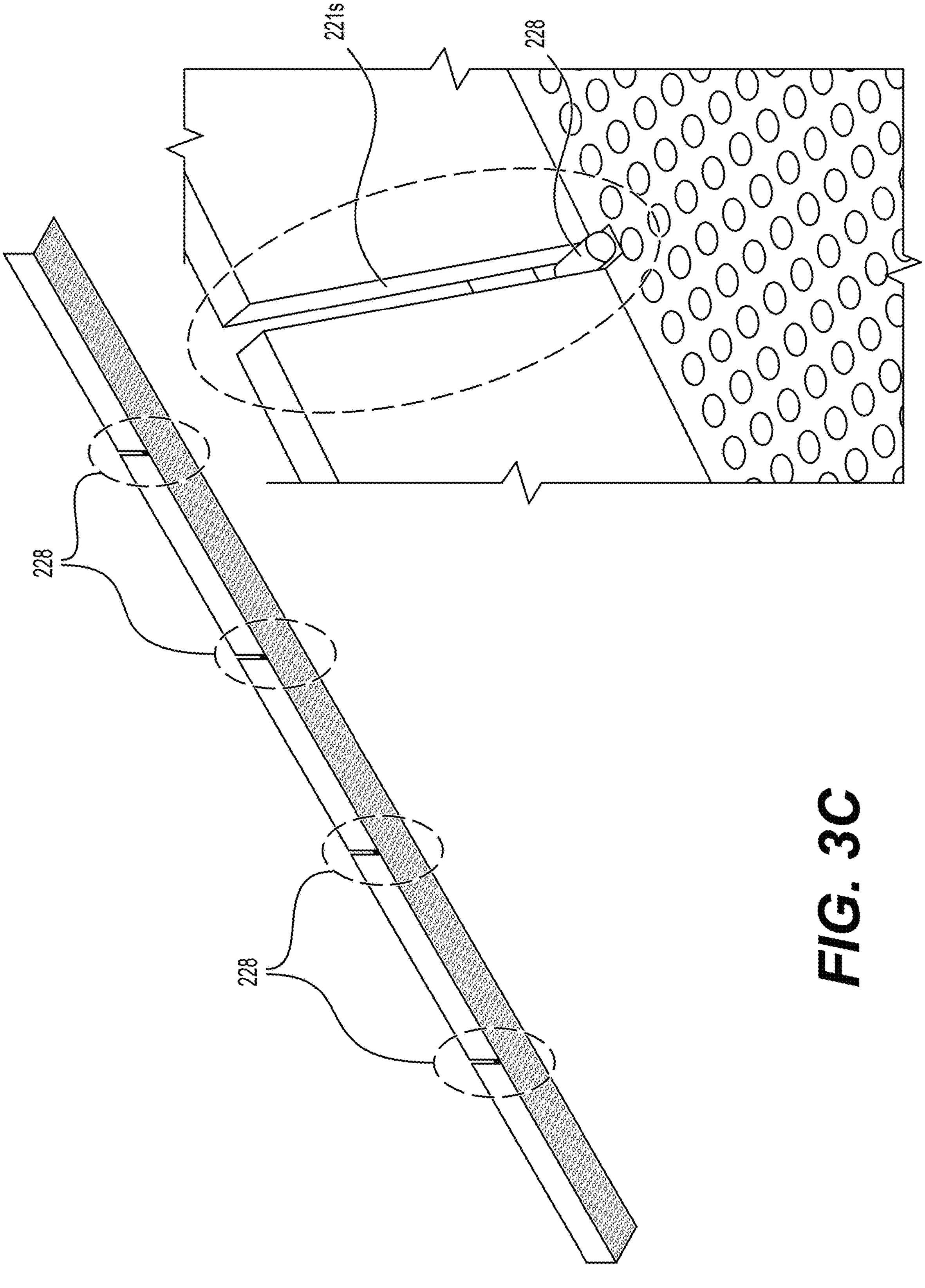
FIG. 3C is a perspective view of a tray configuration including slots formed therein for placement of temperature sensing thermocouples.

FIG. 3C illustrates an embodiment of trays 221 in which slots 221*s* are formed therein. The trays 221 of FIG. 3C may be fastened directly onto the mounting brackets 226 of FIG. 3A without the use of support bars. The trays 221 may include a plurality of slots 221*s* (see close up view) configured to receive a corresponding thermocouple 228. The thermocouples 228 may be mounted on the support bar 227 of FIG. 3A and are positioned to extend through the slots 221*s* and into particle beds carried by the trays 221 as the trays pass the outlet region of the receiver. In this manner, the thermocouples 228 directly measure the temperature of the particles at or near the exit of the particle heating receiver. The thermocouples 228 are electrically connected to a controller, such as a proportional-integral-derivative (PID) controller, which regulates conveyor speed to control particle residence time and maintain a desired outlet temperature.

Collectively, FIGS. 3A-C illustrate a modular, mechanically driven particle heating receiver architecture in which tray geometry, spacing, and motion are configurable to optimize particle heating performance while enabling precise temperature feedback control. The tray embodiments shown in FIGS. 3A-C are provided by way of example only and are not intended to be limiting. It will be understood that trays having other geometries, profiles, thicknesses, perforation patterns, materials, or junction configurations may be employed without departing from the scope of the invention, provided that such trays are configured to support particles and guide them through the solar irradiation zone. Accordingly, the illustrated tray configurations represent exemplary implementations and do not restrict the particle heating receiver to the specific forms shown.

Figure 4:
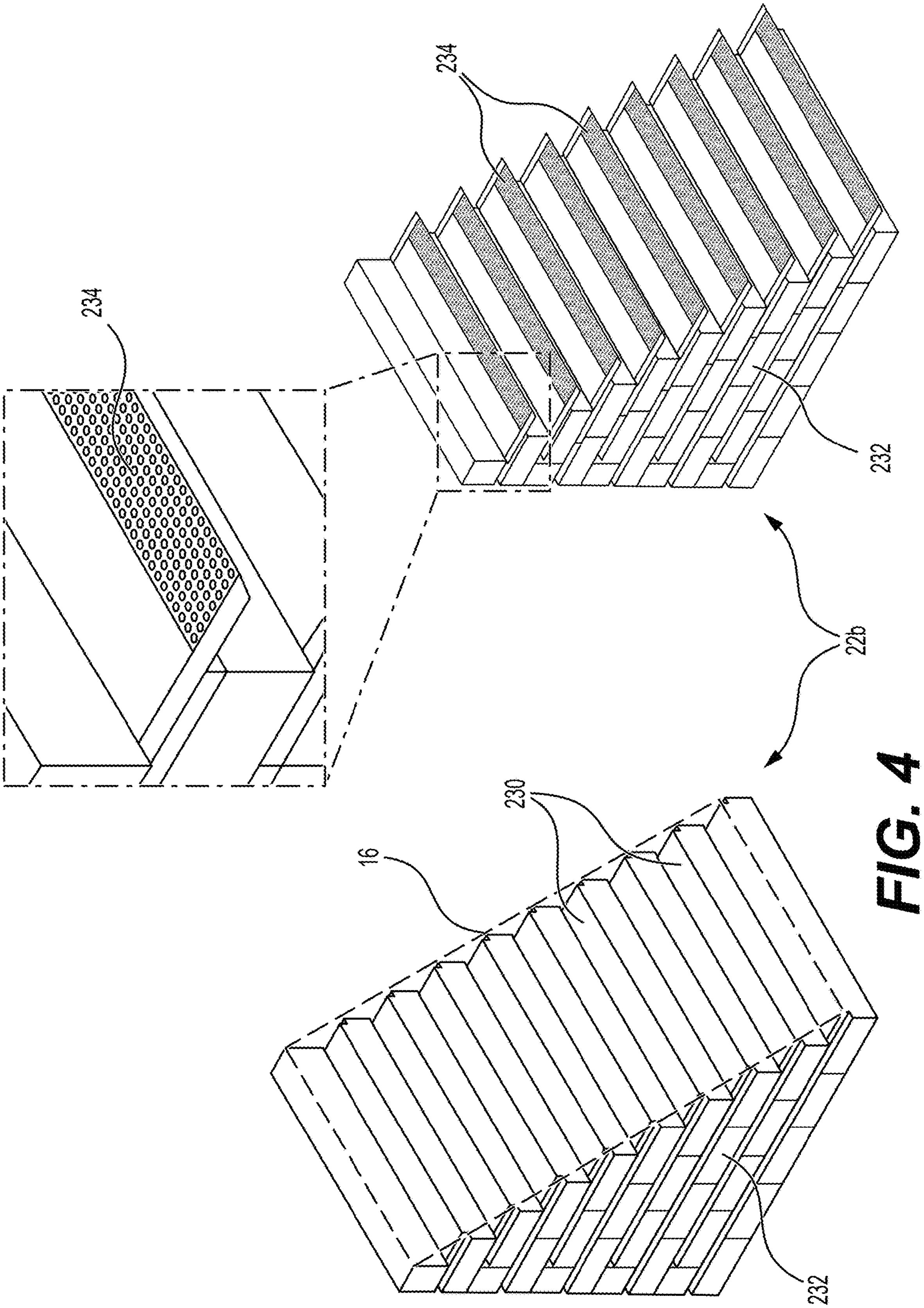
FIG. 4 is a perspective view of embodiments of a stair-shaped particle heating receiver.

Turning to FIG. 4, a second embodiment 22*b* of a particle heating receiver is shown in a stair-shaped configuration for heating solid particles using concentrated solar radiation. This second embodiment 22*b* is distinct from the mechanically driven tray-based receiver described above and primarily relies on gravity to control particle motion through a solar irradiation zone 16.

The particle heating receiver 22*b* is positioned within a solar irradiation zone 16, such that incident concentrated solar radiation directly impinges on particles as they traverse the receiver. The particle heating receiver 22*b* includes a plurality of stairs 230, which function as vertically stacked and angled particle support surfaces arranged to guide particles downward through the solar irradiation zone 16. Each stair 230 includes a generally horizontal tread and a vertical or inclined riser, together forming a stepped flow path that slows particle descent and increases particle residence time within the solar irradiation zone 16.

The stairs 230 are integrally formed with or supported by a body portion 232, which provides structural integrity to the particle heating receiver 22*b*. The body portion 232 is formed from refractory material, such as firebrick, ceramic, or other high-temperature-resistant material capable of withstanding prolonged exposure to concentrated solar flux without significant degradation. The refractory body portion 232 also provides thermal insulation, reducing conductive and radiative heat losses and protecting supporting structures from excessive temperatures.

As particles are introduced at an upper region of the stair-shaped particle heating receiver 22*b*, they descend downward from one stair 230 to the next under the influence of gravity. The stair geometry creates localized packed or semi-packed beds on the treads, which enhances particle-to-particle thermal interaction and shields the underlying refractory material from direct exposure to peak solar flux. This packed bed behavior also promotes more uniform heating and reduces particle entrainment or excessive free fall.

In certain embodiments, one or more of the stairs 230 may include an optional perforated obstruction 234 positioned on an upper surface of the stair. The perforated obstruction 234 may comprise a metallic or refractory perforated plate or screen configured to partially obstruct particle flow. The perforations are sized to permit particle passage while increasing flow resistance, thereby further reducing particle velocity and promoting redistribution of particles across the stair surface. The perforated obstruction 234 also enhances radiative trapping by creating micro-cavities and multiple internal reflections, improving overall heat absorption efficiency.

As illustrated, the inclusion of perforated obstructions 234 is optional, and the particle heating receiver 22*b* may operate with or without such obstructions depending on particle size, desired residence time, and thermal performance requirements. In configurations without perforated obstructions, the stair geometry alone provides sufficient flow control and residence time enhancement. Accordingly, FIG. 4 illustrates a gravity-driven particle heating receiver embodiment 22*b* in which the stairs 230, refractory body portion 232, and optional perforated obstructions 234 cooperate to guide particles downward through the solar irradiation zone 16 while achieving efficient, high-temperature particle heating suitable for concentrated solar power and high-temperature industrial applications.

Figure 5:
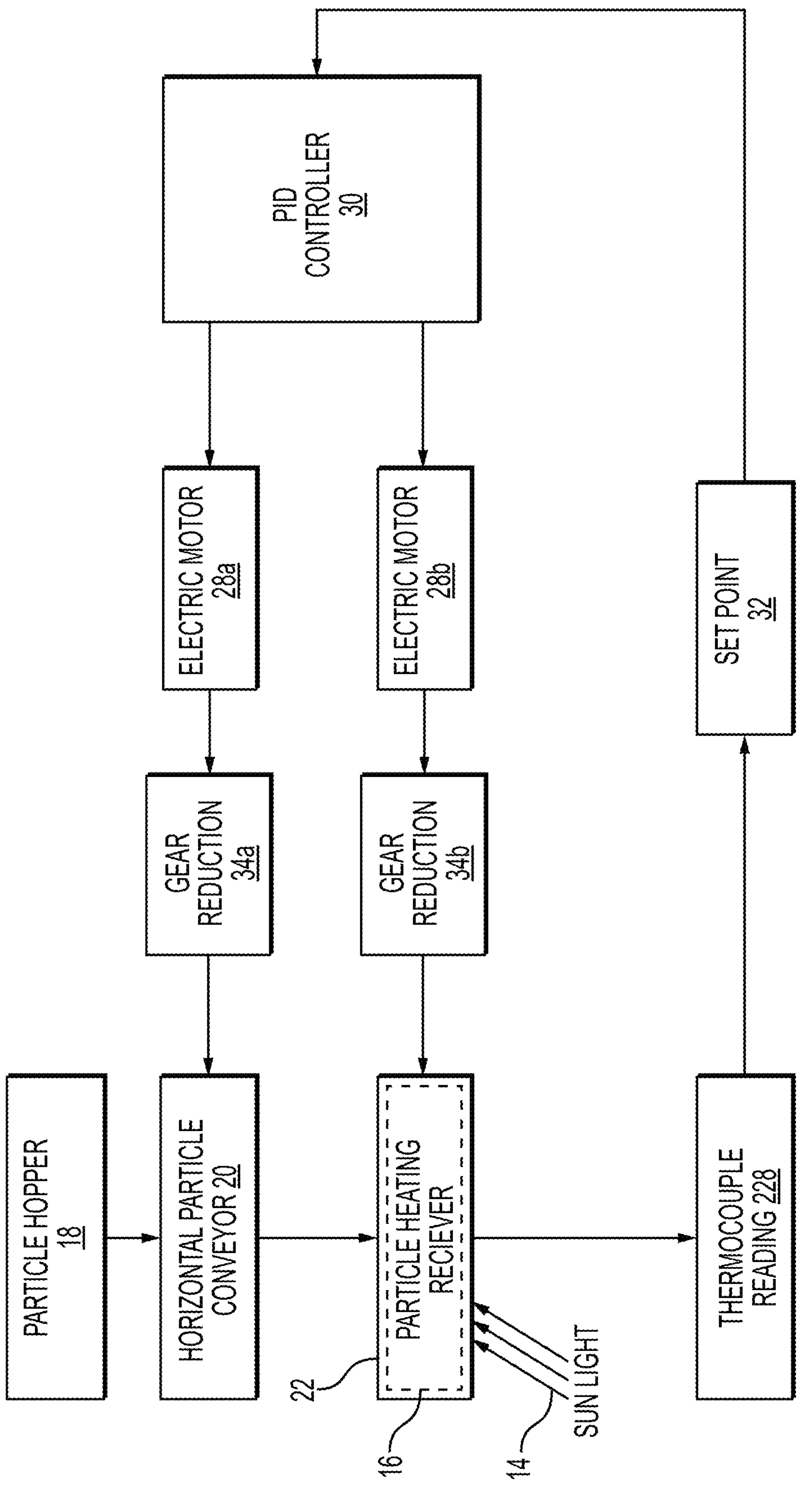
FIG. 5 is a functional block diagram illustrating a control system for a solar particle heating system, showing temperature-based regulation of a horizontal particle conveyor and a particle heating receiver using feedback from a temperature sensor and a predetermined set point.

Turning to FIG. 5, a functional block diagram is shown illustrating an exemplary control architecture for regulating particle transport and heating within the disclosed solar particle heating system. Solid particles are supplied from a particle feeder tank 18, which discharges particles onto a horizontal particle conveyor 20. The horizontal particle conveyor 20 transports the particles toward a particle heating receiver 22, where the particles are exposed to solar radiation 14 within a defined solar irradiation zone 16.

The horizontal particle conveyor 20 is driven by an electric motor 28*a*, which is mechanically coupled to the conveyor through a gear reduction assembly 34*a*. The gear reduction assembly 34*a* reduces the rotational speed of the electric motor 28*a* to a suitable conveyor speed, enabling controlled particle delivery and synchronization with downstream components.

Particles discharged from the horizontal particle conveyor 20 enter the particle heating receiver 22, where they are heated by direct exposure to concentrated solar radiation 14. The particle heating receiver 22 is driven by a separate electric motor 28*b*, which is mechanically coupled to the receiver through a gear reduction assembly 34*b*. The gear reduction assembly 34*b* allows precise control of particle residence time within the solar irradiation zone 16 by adjusting the speed at which particles are conveyed or guided through the receiver.

One or more thermocouples 228 are positioned at or near an outlet of the particle heating receiver 22 to generate a thermocouple reading representative of the exit temperature of the heated particles. This temperature measurement is provided as a feedback signal to the control system. The measured thermocouple reading 228 is compared to a predetermined set point temperature 32, which corresponds to a desired particle exit temperature for a given application, such as power generation or industrial process heat. Based on the difference between the measured temperature and the set point temperature 32, a proportional-integral-derivative (PID) controller 30 generates control signals that regulate operation of the electric motors 28*a* and 28*b*.

In the illustrated embodiment, the PID controller 30 adjusts the speed of the electric motor 28*b* driving the particle heating receiver 22 to increase or decrease particle residence time within the solar irradiation zone 16. Additionally, the PID controller 30 coordinates operation of the electric motor 28*a* driving the horizontal particle conveyor 20 to ensure synchronized particle delivery, thereby preventing overfilling or underfilling of the particle heating receiver.

Through this closed-loop control scheme, FIG. 5 illustrates how real-time temperature feedback is used to dynamically regulate particle flow and residence time, ensuring that particles consistently reach the desired exit temperature while maintaining stable and efficient system operation.

The disclosed solar particle heating system and particle heating receiver (PHR) are particularly well suited for particle-based concentrated solar power (CSP) applications requiring very high operating temperatures. Due to the high solar concentration ratios achievable using solar power tower architectures, the system is capable of heating solid particles to temperatures exceeding 1000° C., and in some embodiments up to approximately 1200° C. or higher. These temperature levels enable applications that are not readily achievable using conventional molten-salt or gas-based CSP receivers, thereby expanding the range of solar-driven thermal processes.

In electricity generation applications, the PHR may be used to supply high-temperature thermal energy to advanced power cycles, including supercritical carbon dioxide ($sCO_2$) Brayton cycles and solar-air Brayton cycles. In such configurations, solid particles, such as silica sand, ceramic particles, or engineered media such as Carbobead, serve both as a heat transfer medium and a thermal energy storage medium. Thermal energy stored in the particles may be transferred to a working fluid, such as air or carbon dioxide, via a downstream heat exchanger, after which the heated working fluid is expanded through turbines or other power conversion equipment to generate electricity. The ability to store thermal energy in solid particles further enables dispatchable power generation, allowing electricity production to continue during periods of low solar irradiance or after sunset.

In addition to power generation, the disclosed system is well suited for a wide range of high-temperature industrial process heat applications. By delivering process heat at temperatures typically between 700° C. and 1400° C., the PHR enables solar-driven operation of industrial processes that traditionally rely on fossil fuels. Non-limiting examples include cement and lime production, calcination processes, phosphate calcination, and other mineral processing operations. In such applications, the particles heated in the PHR may either directly participate in the industrial process or act as an intermediate heat storage medium from which heat is subsequently transferred to process gases, solids, or reactors.

Additional example applications include steel production, where the system may be used for ore preheating or process gas heating; aluminum production, including anode baking operations; glass and ceramics manufacturing, where the PHR may provide supplemental or primary furnace heat; and chemical processing, which often requires stable, high-temperature heat input. The system is also applicable to hydrogen production, such as high-temperature steam generation or heating for solid oxide electrolysis cells (SOECs), as well as mining and mineral processing, including drying, roasting, and thermal beneficiation operations.

The system is geographically well suited for deployment in regions with high direct normal irradiance (DNI), including desert and semi-arid regions such as the Middle East, North Africa, Australia, the southwestern United States, and parts of South America. However, the disclosed system is not limited to desert environments and may be deployed in any geographic location having sufficient solar resource availability and suitable land or infrastructure. Accordingly, the particle heating receiver described herein provides a versatile, high-temperature solar thermal platform capable of supporting both advanced power generation technologies and a wide range of industrial heating applications, thereby reducing reliance on fossil fuels in energy-intensive sectors.

In representative embodiments, the disclosed PHR system is suitable for applications across multiple industrial sectors and operating temperature ranges, including but not limited to: CSP power generation and thermal energy storage (solar irradiance zone temperature: ~600-1200° C.); cement and lime production (heating particles to approximately 700-1450° C.); steel processing (solar irradiance zone temperature: ~800-1100° C.); aluminum processing (solar irradiance zone temperature: ~600-1200° C.); glass and ceramics manufacturing (solar irradiance zone temperature: ~900-1400° C.); chemical processing (solar irradiance zone temperature: ~700-1100° C.); hydrogen production (solar irradiance zone temperature: ~700-1000° C.); and mining and mineral processing operations (solar irradiance zone temperature: ~500-1000° C.). These examples are illustrative and non-limiting, and other applications benefiting from high-temperature solar particle heating should be understood to fall within the scope of the present disclosure.

It is to be understood that the solar particle heating system and methods of use thereof are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A solar particle heating system, comprising:

at least one solar irradiator configured and positioned to direct solar radiation toward a target area defining a solar irradiation zone;

a particle feeder tank configured to store solid particles and discharge the particles at a controlled flow rate;

a horizontal particle conveyor positioned beneath the particle feeder tank and configured to receive particles discharged from the particle feeder tank;

a particle heating receiver positioned to receive particles from the horizontal particle conveyor, wherein the particle heating receiver comprises a plurality of vertically stacked and angled particle support surfaces arranged to guide the particles downward through the solar irradiation zone while the particles are directly exposed to the solar radiation;

a high-temperature thermal energy storage bin positioned beneath the particle heating receiver and configured to receive heated particles discharged from the particle heating receiver; and a control system configured to regulate a speed of particle transport through the particle heating receiver, wherein the control system comprises a proportional-integral-derivative (PID) controller configured to regulate rotation speed of the particle heating receiver.

2. The system of claim 1, wherein the particle heating receiver comprises a conveyor including sprockets and chains.

3. The system of claim 2, wherein a plurality of trays are mounted to the chains.

4. The system of claim 2, wherein a plurality of trays are mounted to support bars coupled to the chains.

5. The system of claim 3, wherein the trays are selected from the group consisting of: solid trays, perforated trays, and combinations thereof.

6. The system of claim 3, wherein the trays are L-shaped or L-shaped with a beveled or chamfered junction.

7. The system of claim 1, wherein the particle heating receiver is mounted on a tilt-adjustable frame.

8. The system of claim 1, wherein the particle feeder tank includes an adjustable discharge opening configured to regulate a particle discharge flow rate.

9. The system of claim 1, wherein the particle feeder tank includes heat exchange tubing therein configured to transfer heat to particles within the particle feeder tank.

10. The system of claim 1, wherein the particle heating receiver includes temperature sensors for measuring a particle temperature thereon.

11. A method of heating solid particles using solar radiation, comprising:

directing solar radiation from at least one solar irradiator toward a target area defining a solar irradiation zone;

discharging solid particles from a particle feeder tank onto a horizontal conveyor;

transporting the particles by the horizontal conveyor to a particle heating receiver;

guiding the particles downward through the solar irradiation zone along a plurality of vertically stacked and angled particle support surfaces of the particle heating receiver while directly exposing the particles to the solar radiation, wherein guiding the particles downward comprises conveying the particles on trays mounted to a vertically oriented angled conveyor including sprockets and chains; and discharging the heated particles from the particle heating receiver into a high-temperature thermal energy storage bin positioned beneath the particle heating receiver.

12. The method of claim 11, wherein a PID controller regulates speed of the horizontal conveyor and the vertically oriented angled conveyor.

13. A solar particle heating system, comprising:

at least one solar irradiator configured and positioned to direct solar radiation toward a target area defining a solar irradiation zone;

a particle feeder tank configured to store solid particles and discharge the particles at a controlled flow rate;

a horizontal particle conveyor positioned beneath the particle feeder tank and configured to receive particles discharged from the particle feeder tank;

a particle heating receiver positioned to receive particles from the horizontal particle conveyor, wherein the particle heating receiver comprises a plurality of vertically stacked and angled particle support surfaces arranged to guide the particles downward through the solar irradiation zone while the particles are directly exposed to the solar radiation, wherein the particle heating receiver is stair-shaped and formed from refractory material; and a high-temperature thermal energy storage bin positioned beneath the particle heating receiver and configured to receive heated particles discharged from the particle heating receiver.

14. The system of claim 13, wherein the particle heating receiver includes perforations in the particle support surfaces.

15. The system of claim 13, wherein the refractory material comprises firebrick.

* * * * *